Sept. 20, 1966     J. G. COTA     3,273,841
DEVICE FOR HOLDING FLOWER RECEPTACLE IN UPRIGHT POSITION
Filed April 23 1965
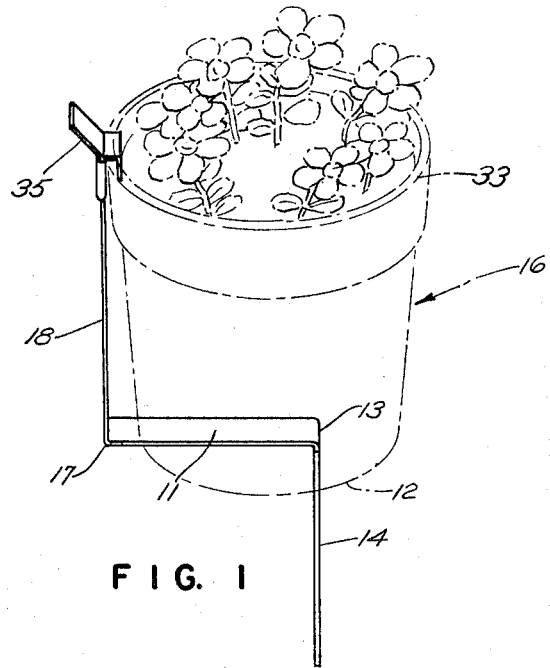
FIG. 1
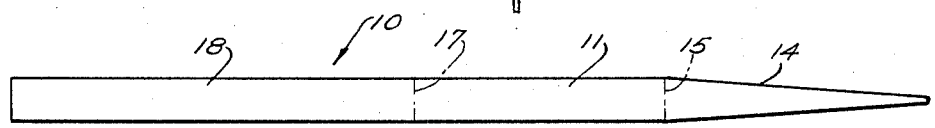
FIG. 2
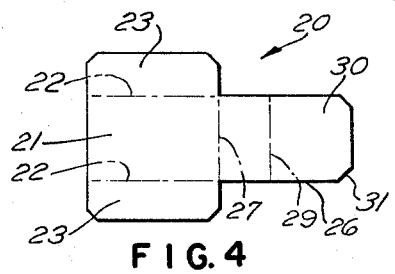
FIG. 4
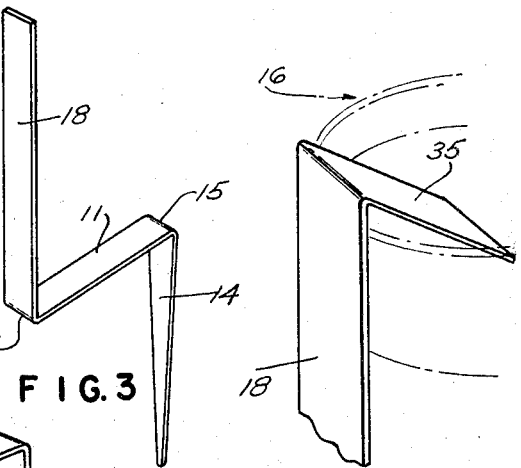
FIG. 3
FIG. 7
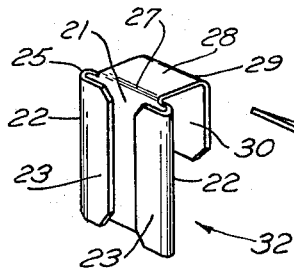
FIG. 5
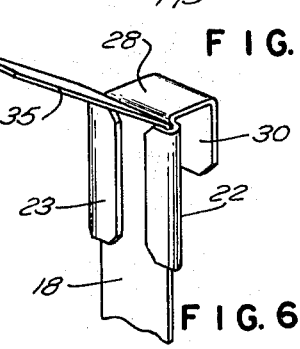
FIG. 6
INVENTOR.
JOHN G. COTA
BY
Barlow & Barlow
ATTORNEYS

United States Patent Office 3,273,841
Patented Sept. 20, 1966

3,273,841
DEVICE FOR HOLDING FLOWER RECEPTACLE
IN UPRIGHT POSITION
John G. Cota, 68 Academy Ave., Providence, R.I.
Filed Apr. 23, 1965, Ser. No. 450,385
3 Claims. (Cl. 248—154)

This invention relates to a device for holding a receptacle in upright position on the ground, such as might be used to hold a flower pot or flower basket or some similar article which might be easily blown over by the wind.

This device consists essentially of a one-piece member bent to provide a portion upon which the receptacle may rest with a stake or leg to extend into the ground and an arm to extend along the outside of the receptacle and be attached to the receptacle at its upper edge. The attachment may be by means of a separate member slidable along the main member.

One of the objects of this invention is to provide a device which is extremely simple and inexpensive to manufacture but one which is extremely simple and inexpensive to manufacture but one which will provide the necessary support to hold a flower pot or some receptacle in an upright position on the ground against being blown over by the wind.

Another object of this invention is to provide a member which may serve the purpose of supporting the receptacle to be retained and which itself may be staked into the ground with some means at its upper end to lock it to the receptacle.

Another object of this invention is to provide a device which may be adjustable for receptacles of different heights so that one device may serve the purpose of accommodating various receptacles of different sizes.

Another object of this invention is to provide a device which will be sufficiently inexpensive so that it may be disposed of after a single use.

With these and other objects in view, the invention consists of certain novel features of construction as will be more fully described and particularly pointed out in the appended claims.

In the accompanying drawings:

FIG. 1 is a perspective view of the device shown in the position of holding a flower pot indicated in broken lines in upright position;

FIG. 2 is a plan view of the main member of the device cut out of sheet stock before bending;

FIG. 3 is a perspective view of the device of FIG. 2 after bending;

FIG. 4 is a top plan view of a blank of the slide member or locking device which may slide along a part of the main member;

FIG. 5 is a perspective view showing the blanked out portion of the slide in FIG. 4 as being bent into operating position;

FIG. 6 is a perspective view showing the slide or locking member mounted on the upright portion of the main member with the main member bent to retain it in position; and FIG. 7 is a perspective view of a modification showing a different manner of bending and holding the main device assembled with the flower pot.

In proceeding with this invention, I cut from a piece of sheet stock, which is sufficiently ductile to be bent easily, a main blank which is thereafter bent at two locations into the form in which the main member will be sold, and I also provide a slide member also blanked from sheet stock and thereafter bent to provide wings and a slideway for positioning it along a part of the main member but also bent to provide a hook to extend over the edge of the receptacle which is to be retained. These two parts are assembled by placing one in slidable relation to the other and then the device is ready to be used. In some instances where simplification is desirable, the slide member may be omitted.

With reference to the drawings, the main member 10 as shown in FIG. 2 is blanked out of sheet stock and is in generally a ribbon form sufficiently thin to be easily bent to provide an intermediate portion 11 for engagement with the bottom 12 of the receptacle to be retained. At one end 13 of this portion 11 there is a leg 14 provided by bending as at 15 which is tapered as seen in FIGS. 2 and 3 so that it may be easily inserted into the ground upon which the flower pot designated generally 16 may rest. A second bend 17 is provided at the other end of the bottom engaging portion 11 so as to provide an arm 18 to extend up along the side of the receptacle 16 as seen in FIG. 1. The bends 15 and 17 provide generally right angles so that the leg portion 14 extends downwardly or in one direction while the arm 18 extends upwardly in the opposite direction. This arm 18 will be of a length to be higher than the receptacle to be retained by it.

A second member designated generally 20 and seen as blanked out in FIG. 4 provides a main body portion 21 which is folded as at 22 on either side so that wings 23 on either side are spaced from the body portion 21 to provide a slideway 25 between the inner surface of the wings 23 and the outer surface of the body portion 21 for the reception of the arm 18 so as to be slidable therealong. At the upper edge of the body 21 a hook is formed by bending the stock 26 which extends from the body 21 as at 27 so as to provide a generally right angularly extending portion 28 which is bent again at 29 to provide a downwardly extending portion 30. The corners may be chamfered as at 31 so as to provide less likelihood for the member now designated generally 32 in its bent-up condition from abrading the hands.

In operation the leg 14 is forced into the ground, the flower pot or other receptacle is placed on the portion 11 with the arm extending close along the side thereof and in substantial engagement with the largest diameter of the receptacle. The slide member 32 is then slid downwardly so that its hook portion extends over the upper edge 33 of the receptacle with the portion 30 extending into the receptacle, and then in order to lock the slide in such position, the upper end portion 35 of the arm 18 is bent sufficiently so that the slide cannot move upwardly to disengage the receptacle. This portion may be folded back upon itself to extend downwardly where desired.

In some cases, instead of using the slide such as shown at 32 where further simplification is desired, the upper end 35 of the arm 18 may be bent over the receptacle as shown in FIG. 7 inwardly so as to lock the receptacle to the main member of the device.

I claim:

1. A device for holding a receptacle in upright position on the ground comprising a member of one piece of flat sheet material having a receptacle bottom engaging portion for engagement with the receptacle to be held in position, a leg extending in one direction from one end of said portion and at generally right angles thereto for insertion into the ground, and an arm extending in the opposite direction from the other end of said portion at generally right angles thereto to be positioned along the outside of the receptacle and to a height greater than said receptacle, and means at the upper end of said arm for extending over and engaging the upper edge of said receptacle to hold it in engagement with said bottom engaging portion.

2. A device as in claim 1 wherein said means comprises a second member slidable on the arm and having a finger to hook over the upper edge of said receptacle.

3. A device as in claim 1 wherein said means comprises a second member slidable on the arm and having a finger to hook over the upper edge of said receptacle, said arm being sufficiently ductile to be bent over said second member and lock it in place.

References Cited by the Examiner
UNITED STATES PATENTS

| | | | |
|---|---|---|---|
| 1,876,478 | 9/1932 | Van Duzer | 248—38 |
| 2,140,862 | 12/1938 | Sumner | 47—34 |
| 2,176,352 | 10/1939 | McHuron | 248—38 |
| 2,399,498 | 4/1946 | Messick | 248—154 |
| 2,482,278 | 9/1949 | Koerner | 248—156 |
| 2,505,885 | 5/1950 | Davis | 248—361 |
| 2,554,120 | 5/1951 | Pisano | 248—238 |
| 2,679,996 | 6/1954 | Powe et al. | 248—149 |
| 3,091,424 | 5/1963 | Yegge | 248—313 |
| 3,193,234 | 7/1965 | Thurman et al. | 248—313 |

CLAUDE A. LE ROY, *Primary Examiner.*